United States Patent [19]

Atkisson

[11] 4,249,930
[45] Feb. 10, 1981

[54] IONIC COMPOUNDS FORMED FROM IRON AND UREA

[75] Inventor: A. David Atkisson, Neosho, Mo.

[73] Assignee: Eagle-Picher Industries, Inc., Cincinnati, Ohio

[21] Appl. No.: 18,519

[22] Filed: Mar. 8, 1979

[51] Int. Cl.³ .............................................. C05C 9/00
[52] U.S. Cl. .......................................... 71/28; 71/63; 71/64 C; 71/DIG. 2; 564/32
[58] Field of Search ............... 71/1, 28, 63, 64 C, 71/DIG. 2; 260/555 R, 555 C, 555 S

[56] References Cited

U.S. PATENT DOCUMENTS

| | | | |
|---|---|---|---|
| 3,180,735 | 4/1965 | Titus | 426/69 |
| 3,617,239 | 11/1971 | Klanica et al. | 260/555 C X |
| 3,640,698 | 2/1972 | Backlund | 71/28 X |
| 3,867,124 | 2/1975 | Church | 71/28 X |
| 3,976,467 | 8/1976 | Seferian et al. | 260/555 S X |
| 4,116,664 | 9/1978 | Jones | 260/555 S X |

Primary Examiner—S. Leon Bashore
Assistant Examiner—Ferris H. Lander
Attorney, Agent, or Firm—Wood, Herron & Evans

[57] ABSTRACT

Novel ionic compounds of the class $$[Fe\{CO(NH_2)_2\}_n(H_2O)_{6-n}]^{++}SO_4^{--}$$

wherein n is 2, 3, 4 or 5, are produced by solid state reaction between a ferrous sulfate hydrate and urea under extended intensive physical impingement conditions, as for example by ball milling for a period in excess of 2 hours, until particles of an unusual characteristic shape are formed. Uses of the compounds include correcting iron deficiencies in plants.

20 Claims, 10 Drawing Figures

IONIC COMPOUNDS FORMED FROM IRON AND UREA

FIELD OF THE INVENTION

This invention relates to novel ionic iron carbamide compounds and to methods of making and using them. Among other uses, these compounds are especially effective for soil or foliar application to provide iron for treating plant iron deficiencies.

BACKGROUND OF THE INVENTION

In most soils iron is abundantly present. Nevertheless, enormous acreages of agricultural land in the U.S. lack an adequate supply of iron in a form that is useful for the growth of the plants that are commonly raised there. In Western states, for example, it is estimated that more than 12 million acres (about 5% of the total cultivated acreage in 22 states west of the Mississippi River) are deficient in available iron.

The deficiency of available iron adversely affects plant growth generally by retarding foliage, flowering and seed production. This is often manifested in the growing plant as a sickly yellow-leaf condition known as "chlorosis."

THE PROBLEM IN THE ART

Chlorosis caused by iron deficiency has been known since 1845. However, according to "Iron-The Elusive Micronutrient" by J. J. Mortveldt et al, *Fertilizer Solutions* 21(1), January 1977, satisfactory and economical methods of correcting iron deficiencies of many plant species have not been developed. In general, the problems with existing materials for treating iron deficiencies are the cost of the material itself, the expense and criticality of applying it properly and when required, and lack of plant response.

The most commonly used materials for treating iron deficiencies have been the ferrous and ferric sulfates and oxides. While these materials are themselves inexpensive, plant response to them is generally inadequate unless they are applied repetitively, which increases their cost. A number of organic chelated compounds are also used, including for example an iron salt of ethylenediaminetetraacetic acid sold commercially by Ciba-Geigy Chemical Corp. under the trademark "SEQUESTRENE." These organics are effective but are so expensive as to be restricted to use on high value crops and in other special situations.

At the present time the most economical corrective measure used for iron deficient plants has been multiple and timely foliar applications (usually by air) of ferrous sulfate ($FeSO_4$) solution to the growing plants. This has been practical only on moderately iron deficient areas; economically justifiable results have been poor or frequently not obtained on areas that are seriously iron deficient. The timing of the applications is quite critical. Moreover, the plants are often badly burned, and the growth appearing after an application is again chlorotic. Application of the sulfate directly to the soil usually does not give worthwhile plant response.

THE PRIOR ART

Titus U.S. Pat. No. 3,180,735 teaches that urea can form molecular addition complexes with inorganic salts and acids, wherein the urea combines with the salt or acid in molar ratios which are whole numbers. In some instances a mol of water may be included Halpern U.S. Pat. No. 2,958,594, assigned to Borden, shows a technique for "chelating" ferrous sulfate heptahydrate, $FeSO_4.7H_2O$, with a urea-formaldehyde fertilizer. This is done by mixing the ferrous salt in water with urea and formaldehyde at an acidic pH, until the urea and formaldahyde form a condensate that is only slowly soluble in water, and until the trace element is chelated in the condensate as shown by a reduction in the ionic activity of a trace element. The iron is to be present in very small concentrations, only about 0.0002 to 0.004 parts by weight for each part of the ureaform condensate on a dry basis. The material is useful for plant growth by foliar or dry application.

Klanica et al U.S. Pat. No. 3,617,239, assigned to Olin Mathieson, is directed to a process for coating urea fertilizer prills with an iron-urea complex to reduce caking. The prills are tumbled with "dry powdered $FeSO_4.7H_2O$," during which the urea of the prills displaces the water of hydration of the heptahydrate and becomes wet. A coating is formed on the prills which the patent identifies as $FeSO_4.7CO(NH_2)_2$. The patent states that the same complex can also be prepared by pulverizing dry $FeSO_4.7H_2O$ with urea in 1:7 mol ratio.

Backlund U.S. Pat. No. 3,640,698, assigned to Union Oil, teaches foliar application of a fertilizer solution based on urea, metal sulfates and water, wherein the concentration of the solutes is less than the salting out concentration at 20° C. The product is essentially a high nitrogen fertilizer solution containing dissolved iron sulfate.

BRIEF DESCRIPTION OF THE INVENTION

This invention provides compounds of a new type, having the generic formula

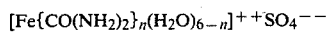

$$[Fe\{CO(NH_2)_2\}_n(H_2O)_{6-n}]^{++}SO_4^{--}$$

wherein n is 2, 3, 4, or 5. They are called aquocarbamide iron II sulfates, and are produced by prolonged intimate solid state contacting of a ferrous (Fe II) sulfate hydrate and urea.

Previously known complexes between urea and hydrated iron salts, including those shown in U.S. Pat. No. 3,617,239, have been inclusion adducts, which form rapidly upon contact of the salt and urea or in solutions. In contrast, the products of this invention are not adducts but rather are distinct new compounds which form only after intensive contacting, as for example by grinding in a ball mill for about 2½ hours. Their formation is manifested, among other ways, by formation of particles of a distinctive new shape. The particle shape change begins only after a prolonged period of intensive physical impingement of the particles on one another. It is believed that the change only occurs upon the input of a certain minimal quantum of kinetic energy. This phenomenon is most apparent if the reacting mixture is periodically examined by microscope as contacting proceeds.

The new compounds are characterized by particles of an unusual shape which, for want of a pre-existing definition, can be called a "fat H" or "dumbbell" shape. The compounds are formed in several different urea/iron ratios, which are whole numbers: ratios of 2, 3, 4, and 5, are presently known, according to the mole ratios of the starting components.

In the solid state reaction between the hydrated sulfate and urea, the water of hydration of the starting material is not all displaced by the urea. For instance, in the reaction between ferrous sulfate heptahydrate and urea to form the new n+4 compound the overall reaction is at present believed to be

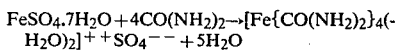

$$FeSO_4.7H_2O + 4CO(NH_2)_2 \rightarrow [Fe\{CO(NH_2)_2\}_4(H_2O)_2]^{++} + SO_4^{--} + 5H_2O$$

Thus, use of the heptahydrate as the starting material leads to the formation of a product wherein the total number of molecules (urea+water) bonded to the iron equals six. Without intending to limit the invention, it is theorized that this is due to electronic structure of FeII ($d^2Sp^3$ hybrid orbitals) wherein six coordination sites are available, with the urea acting as a neutral ligand with its oxygen providing the election pair for the coordinate covalent bond to be formed. The remainder of the sites are occupied by water. The $SO_4^{--}$ remains simply as the anion for the 2+ cationic complex.

The displaced water wets the reaction product, which forms as a slurry of solid particles in the water. As the reaction proceeds, the crystals of the new product form in this fluid mass, until equilibrium is reached. The conversion to the new material can most readily be identified by optical microscope examination: the compound has visibly been formed when particles of the characteristic "fat-H" or dumbbell shape appear. It can also be distinguished by its x-ray diffraction pattern in conjunction with its infrared spectrum.

I presently prefer to make the new compound from iron II sulfate heptahydrate, with an iron-urea reactant ratio of 1:4, i.e., n=4. The heptahydrate is economical and stable; and the 1:4 ratio provides an adequate concentration of iron. However, the material can also be made at iron/urea reactant ratios of 1:2, 1:3, and 1:5, and from other hydrates than the heptahydrate. The monohydrate may be used, as can the other known hydrates, i.e., those with 4 and 5 molecules of water.

The new compounds are economical to produce and use agriculturally. Where iron deficiency exists, the use of the new compounds produces substantially improved plant response. These compounds are suitable for application to plants or soil in liquid and dry forms.

It has been found that a single foliar application will effect good plant response in many cases. Moreover, the new plant growth that appears after foliar application in accordance with the invention is non-chlorotic; that is, it does not display the yellow condition. This indicates "translocation" of iron within the plant, from the point of application on previous growth to the new growth. The new compounds can be applied during the hot part of the day, with little or no burning of the leaves. Plant response is usually quick and can often be observed in 24 hours after application.

The new compounds differ from other iron compounds as already noted in these respects:
 a. single application effectiveness;
 b. new plant growth is non-chlorotic;
 c. little or no burning from application, even under hot and dry conditions.

Greenhouse studies have shown that the new compound can also be used by direct application to the soil, before planting. In this respect it is again an improvement over previously used compounds, which lose their efficiency rapidly upon soil contact. In one test, soil applied material in accordance with the invention was found still to be effective four months after application.

The invention can best be further described and explained by reference to the accompanying photomicrographs. Except as noted, each was originally taken at a magnification of 375× but now appears at a different magnification as a result of reproduction.

BRIEF DESCRIPTION OF THE PHOTOMICROGRAPHS

Figure 9:
Figure 10:
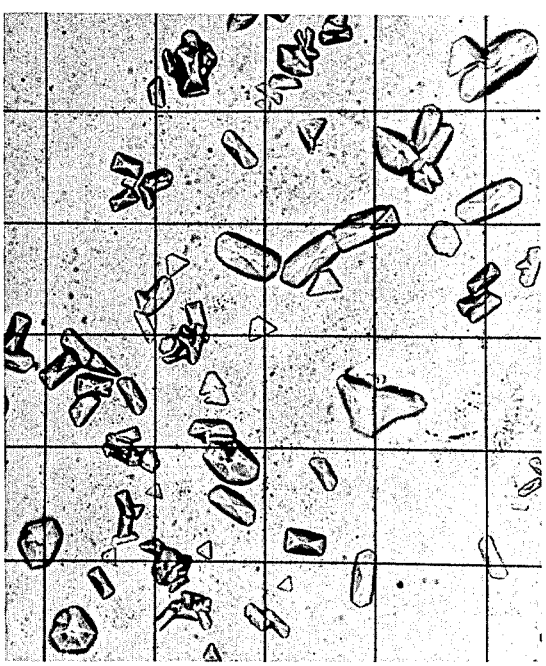

FIG. 9 shows particles of a mixture of ferrous sulfate heptahydrate and urea in a 1:7 ratio, after 30 minutes grinding time, and illustrates that the particles thereof lack the characteristic shape of particles in accordance with this invention, and FIG. 10 is a photomicrograph of the same material as in FIG. 9, showing that the particle shape remains essentially the same after three hours of ball milling.

EXAMPLE 1

Preparation of n=4 compound from ferrous sulfate heptahydrate by ball milling

Figure 1:
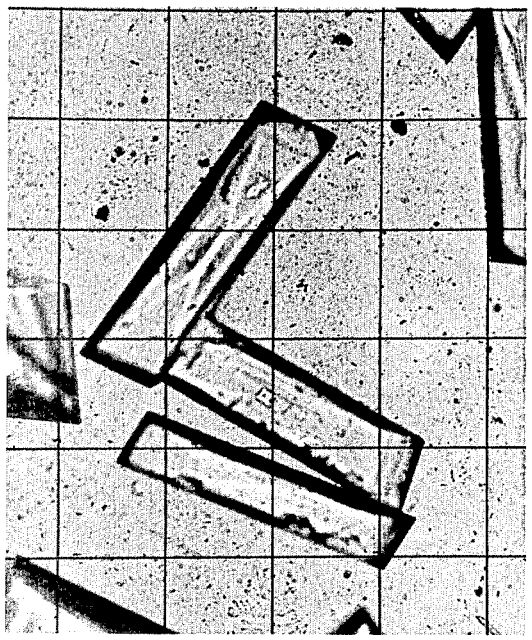
FIG. 1 shows particles of ferrous sulfate heptahydrate.
Figure 2:
FIG. 2 shows urea particles.
Figure 3:
FIG. 3 shows particles of a 1:4 mixture of ferrous sulfate heptahydrate and urea particles after one hour of intensive contacting in a ball mill.
Figure 4:
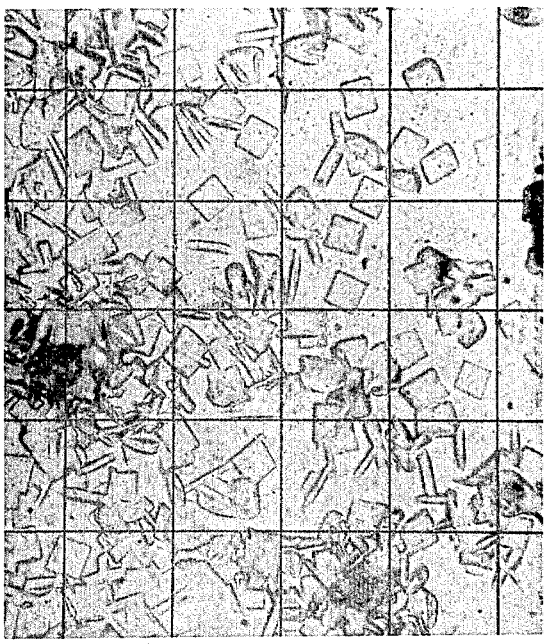
FIG. 4 is similar to FIG. 3 but shows the particles after two hours of ball milling.
Figure 5:
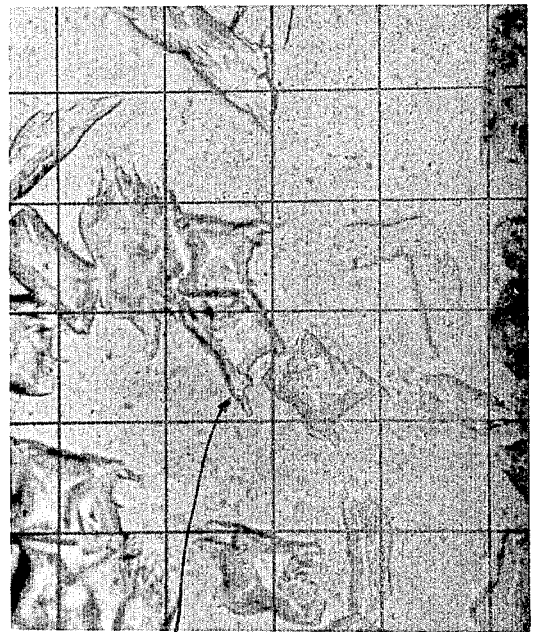
FIG. 5 illustrates the progress of reaction at 2½ hours of ball milling, and shows the "fat H" particles of the new compound beginning to appear.
Figure 6:
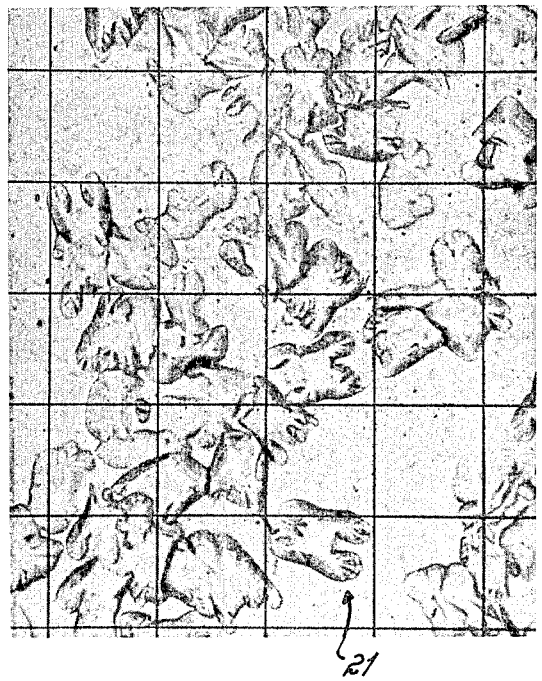
FIG. 6 is similar to FIG. 5 but shows the shape of the particles of the new compound after three hours of ball milling.

One mole (278 g) of dry $FeSO_4.7H_2O$ and four moles (240 g) of dry urea were placed in a 1 gallon ball mill filled with 2800 g of ceramic balls. No water was added. The mill was run at about 30 rpm. No heat was supplied. FIGS. 1 and 2 show the particles of the sulfate and urea starting materials respectively. The ball milling brings the particles into intensive physical impingement. For a substantial period of time as the milling proceeds the particles of the initial mixture, consisting of particles of the types shown in FIGS. 1 and 2 respectively, do not significantly change in form. This is evident in FIGS. 3 and 4 in which the block-like ferrous sulfate crystals and the elongated urea crystals are still readily apparent, although they now are substantially smaller than initially. However, after a certain energy input, corresponding to a certain period of time for given equipment (between 2 and 2½ hours for this particular equipment) the particle shape dramatically changes as shown in FIG. 5, in which the particles appear to have grown extended "legs" at their corners, as designated by the number 20 in FIG. 5. Formation of particles of this shape proceeds rapidly, and shortly thereafter (at three hours' time, in this equipment) many particles will display the even more advanced configuration designated at 21 in FIG. 6. The particle shape shown in FIGS. 5 and 6 (and in FIGS. 7 and 8 as discussed hereafter) is referred to herein as the "fat H" or dumbbell shape. Contacting may be stopped when a substantial proportion of the particles shows this shape, indicating that equilibrium has been reached. Attaining equilibrium can also be confirmed when x-ray diffraction and infrared spectrum show the patterns unique to this compound.

The particles of the product (in this n=4 example, diaquotetracarbamide iron II sulfate) are a light brown crystalline material and are suspended in displaced water of hydration. In each of the photomicrographs 1-6, each grid square denotes an area 50×50 microns. If grinding is continued beyond the point at which such particles appear, the characteristic shape is apparently retained, but the particles gradually become smaller and smaller. In particles which have been ball milled for 7 hours, for example, the fat H shape can still be seen at higher magnification, e.g., 1000×. The infrared spectrum of the compound indicates the presence of uncoordinated ionic sulfate, and further that the oxygen content of urea and water are both coordinated to the Fe II. The x-ray diffraction pattern of liquid (undried) samples of the material show it to be a good crystalline material with d spacings different from any previously known compound, including $FeSO_4.7CO(NH_2)_2$. Chemical analysis of the crystallites (dried under vacuum at 60° C., 25 mm Hg) shows them to contain 13.0% Fe, 26.2% N, 22.5% $SO_4$, and 8.4% $H_2O$. This approximates the theoretical formula previously set forth.

EXAMPLE 2

Figure 7:
FIG. 7 is a photomicrograph originally taken at 1000×, showing particles of a compound in accordance with the invention at a 1:2 iron/urea ratio.
Figure 8:
FIG. 8 shows particles of a 1:3 compound in accordance with the invention.

Preparation of n=2 Compound 278 grams of dry $FeSO_4.7H_2O$ and 120 grams of dry urea, corresponding to a 1:2 mole ratio of iron to urea, were placed in a ball mill of the same type as in Example 1. No water was added. At 2 hours milling time small particles having the characteristic fat H shape were visible at 1000× under the optical microscope, as shown in FIG. 7.

EXAMPLE 3

Preparation of n=3 Compound 278 grams of dry $FeSO_4.7H_2O$ and 180 grams of dry urea were placed in the ball mill without water, this ratio of reactants corresponding to a 1:3 iron/urea ratio. After milling for 3 hours, examination at 375× showed that fat-H particles had been formed, as illustrated as in FIG. 8.

In addition to ball milling as the physical impingement technique for forming the new compound, other techniques can be used, even including hand grinding by mortar and pestle. In upscaling the process for production, other equipment can be used which provides intensive physical impingement of the particles on one another to supply the necessary kinetic energy input that effects the equilibrium shift from the starting materials to the iron aquocarbamide including, by way of example and without limitation, various forms of mills such as conical mills, tri-cone mills, cylindrical mills, cascade mills, rod mills, tube mills and roller mills. In order to facilitate the production, a small amount of water (or previously made compound) may be added to the starting materials. The progress of reaction can most readily be followed by taking samples periodically and examining them under optical microscope. There appears to be no particular advantage in longer contacting beyond that necessary to achieve equilibrium and development of the new crystals, although as shown below it is not harmful in terms of compound stability and agronomic results.

The particles formed in accordance with the present invention differ from the addition adducts previously known. FIGS. 9 and 10 show particles of the adduct produced by contacting iron sulfate and ferrous sulfate heptahydrate with seven moles of urea. The resulting material has a different x-ray diffraction pattern and regardless of mixing time the particles do not display the fat H shape characteristic of the present compound. FIG. 10 shows that even after 3 hours of grinding time, the particles still show the same shape as seen in FIG. 9, which shows them as they appeared at ½ hour of grinding.

Use of New Compounds

The carbamide content of the new compounds stabilizes the iron and makes it available to the plant in surprising new ways. While the carbamide does supply a small amount of nitrogen, the rate of application is based on iron content, not on nitrogen content. These materials can be either in liquid form (for example, as made), or dried, and can be soil or foliar applied. Soil or foliar application rates will vary in accordance with the crop and/or soil conditions but are typically in the range of 25 to 400 pounds of the new material (as made in the wet form) per acre.

The following Examples show the use under different conditions.

EXAMPLE 4

Prolonged Soil Persistence

On Aug. 8, 1978, late in the growing season, material produced in accordance with Example 1 was applied as a liquid suspension to soil in an area on which chlorotic sorghum had earlier been grown. The material was applied to separate plots at rates corresponding to 50, 100, 200 and 400 lbs. of wet material (as produced) per acre. Because of the lateness of the growing season, no results could be obtained in the field. However, in November, i.e., three months later, soil from the respective plots was dug up and taken into the greenhouse. The soil samples were treated with a fertilizer solution containing 100 ppm of N and P, 50 ppm K, 20 ppm S, and 10 ppm of Zn to insure good plant growth. The soil was placed in plastic pots containing 2 kg. each of soil, and six TY101 sorghum seeds were planted in each pot. Approximately one week after emergence the sorghum was thinned to four plants per pot.

No iron was applied, other than the residual amount remaining from what had been applied several months before to the soil in the field.

After approximately six weeks of growth the plants were evaluated and rated by several independent researchers for chlorosis on a numerical scale of 0–10, the higher numbers corresponding to lower chlorosis. The plants were harvested by cutting them off at soil level, and the green weight and dry weight of the growth in each pot was determined. Results are shown in Table I according to different rates of field application of the material.

TABLE I

| | Results in Greenhouse | | |
|---|---|---|---|
| lb/A of Material | Green Wt. g/pot | Dry Wt. g/pot | Chlorosis Ratings (0–10) |
| None | 12.46 | 1.50 | 3.5 |

TABLE I-continued

| | Results in Greenhouse | | |
|---|---|---|---|
| lb/A of Material | Green Wt. g/pot | Dry Wt. g/pot | Chlorosis Ratings (0–10) |
| 50 lbs/A | 29.31 | 3.90 | 4.3 |
| 100 lbs/A | 22.36 | 3.06 | 5.7 |
| 200 lbs/A | 28.52 | 3.61 | 4.5 |
| 400 lbs/A | 42.32 | 6.14 | 8.3 |

From the table it appears that the weight of the sorghum plants generally increased with the amount of material applied, and that chlorosis was generally reduced as application rate increased. Since the Fe treatments were applied several months before the soil was collected and moved to the greenhouse, it appears that there is a prolonged period of availability associated with this material.

EXAMPLE 5

Comparison With Other Materials

Eight different materials were prepared as follows:

1. A solution was prepared containing 33% water, 40% urea and 27% $FeSO_4$, which corresponds to 18% N and 5.4% Fe. This solution is taught in U.S. Pat. No. 3,640,698, previously identified, as Solution 2 in Table II.

2. A solution of 640 grams urea in 1360 grams water, corresponding to 15% nitrogen.

3. 1195 grams of $FeSO_4.7H_2O$ were dissolved in 1305 grams of water. This corresponds to an iron concentration of about 9.5%.

4. 45.4 grams of $FeSO_4.7H_2O$ were tumbled for 5 minutes with 908 grams of urea prills. The product was dried in a vacuum of 25 mm Hg, for 2 hours at 60° C., as taught in U.S. Pat. No. 3,617,239, previously identified, as Example 2. This corresponds to 42.9% N and 0.94% Fe.

5. 272 grams of approx. 44% formaldehyde solution were mixed with 0.5 grams $Na_2CO_3$, 248 grams urea, and 240 grams $FeSO_4.7H_2O$. This material is based on Example 6 of U.S. Pat. No. 2,958,594, previously identified. These proportions correspond to 6.2% Fe, 14.8% N.

6. A 1:4 compound in accordance with the invention was prepared as shown in Example 1 above, ground in a ball mill for about 3 hours, containing 10.7% Fe, 21.6% N (wet basis).

7. A 1:4 compound similar to material 6 above, was milled for 18 hours, 10.7% Fe, 21.6% N.

8. A 1:3 compound was produced in pilot plant operation. The manufacturing technique used was as follows: Approximately 20 pounds of 1:4 compound was mixed with about 20 pounds of 1:2 compound. The mixture of the two compounds (approximately 40 pounds) was used as a starting or lubricating material for the milling process to facilitate production of about 460 pounds of finished material. Colloidal attapulgite gelling and suspending agent was added to the finished product as a suspending agent to improve the dispersion of the particles in the liquid. In this material the Fe content was about 12.2% and the N content about 18.3%.

Sorghum seeds were planted in pots containing soil samples from a field known to produce iron chlorotic plants. The eight materials described above were applied by spray to the plants at approximately three weeks of growth, at which time the plants were in a 3-4 leaf stage of growth. Spraying was accomplished with a hand spray that produced approximately 250 micron droplet size. After approximately six weeks' growth the plants were evaluated as in Example 4. Comparisons of the plants as treated by the eight different test materials, at rates corresponding to 25, 50 and 100 pounds of spray per acre appear in the following table.

TABLE II

| | Treatments, Equivalent Field Rate, lbs/acre | Green Wt.Yield g/pot | Dry Wt.Yield g/pot | Chlorosis Rating (0–10) |
|---|---|---|---|---|
| Control | 0 | 10.90 | 1.28 | 1.8 |
| Mat. #1 | 25 | 16.23 | 3.09 | 4.8 |
| | 50 | 21.34 | 3.83 | 6.0 |
| | 100 | 23.35 | 4.10 | 7.7 |
| Mat. #2 | 25 | 12.87 | 1.67 | 3.0 |
| | 50 | 9.95 | 1.49 | 2.1 |
| | 100 | 10.23 | 1.41 | 1.7 |
| Mat. #3 | 25 | 16.98 | 2.84 | 4.7 |
| | 50 | 17.43 | 2.77 | 5.8 |
| | 100 | 16.95 | 2.74 | 7.3 |
| Mat. #4 | 25 | 18.14 | 2.34 | 4.0 |
| | 50 | 15.06 | 2.05 | 3.6 |
| | 100 | 11.37 | 1.93 | 3.3 |
| Mat. #5 | 25 | 11.83 | 1.60 | 3.0 |
| | 50 | 20.16 | 3.10 | 5.3 |
| | 100 | 23.20 | 3.74 | 6.3 |
| Mat. #6 | 25 | 16.73 | 2.81 | 7.4 |
| | 50 | 20.82 | 3.32 | 8.1 |
| | 100 | 19.19 | 3.39 | 8.7 |
| Mat. #7 | 25 | 21.84 | 3.50 | 7.1 |
| | 50 | 30.19 | 4.62 | 7.8 |
| | 100 | 19.61 | 3.46 | 8.1 |
| Mat. #8 | 25 | 18.44 | 3.15 | 6.4 |
| | 50 | 31.18 | 5.07 | 8.3 |
| | 100 | 32.14 | 5.50 | 9.0 |

Materials No. 6, 7 and 8, all made in accordance with the invention, gave good yield increase of plants and produced plants with the least indication of chlorosis. These materials were easy to spray and produced a minimum burning of the leaves. Materials No. 2 and 4 produced considerable burning of leaves and did not correct the chlorosis. Material No. 3 corrected the chlorosis to some degree but yields were not substantially improved. Material No. 5 improved the chlorosis condition and produced some improvement in yield, but was very difficult to spray because of its physical nature. Material No. 1 produced results similar to Nos. 3 and 5.

EXAMPLE 6

Field Test

A test field which had a long history of causing chlorosis was planted in sorghum. When the plants were about 6–10" high, materials in accordance with Examples 1 and 2 (with 1:4 and 1:2 Fe/urea reactant ratios respectively) were applied at rates of 25, 50, 100 and 200 pounds per acre as a foliar spray. The irrigation system failed during the growing season and as a result the sorghum was under severe moisture stress during much of the season. Nevertheless, only very slight burning on leaf margins resulted from the higher rates of application. Even without the benefit of rain or irrigation the chlorotic plants showed marked improvement within two days after the spray application. Visual observations indicated that the low rate application (25 lbs. per acre) was almost as effective as the higher rate application in causing the plants to regain their natural green color. The treated plants retained their vigor until maturity.

As the plants grew and new leaves emerged, the new growth was green (non-chlorotic). In contrast, where other iron-based materials were used, the new leaf growth appearing after spray treatment was again chlorotic and required retreatment to attain normal growth. This seems to indicate that the new compound provides Fe in a form which achieves desirable translocation from the treated leaves to the new plant growth.

The yield results verify the visual observations made during the growing season:

TABLE III

| Rate of Material per acre | Yield of Grain lbs/acre |
|---|---|
| None | 1310 |
| Ex. 1  25 | 1870 |
| 50 | 2154 |
| 100 | 1506 |
| 200 | 2464 |
| Ex. 2  25 | 1764 |
| 50 | 1715 |
| 100 | 2096 |
| 200 | 2617 |

EXAMPLE 7

Lawn Grass

In addition to the sorghum treated in Examples 4, 5 and 6, the new compounds have also been tested on a range of other plants including soybeans, lawn grass, and corn, which gave similar responses to those cited. The effect of the materials of the invention on lawn grass was demonstrated as follows:

A lawn composed of cool season grasses, mostly fescue and Kentucky bluegrass, was treated in June of the year with an n=4 composition in accordance with Example 1. Treatment was by spray application at a per acre rate of about 100 pounds of the material as manufactured, mixed in 20 gallons of water. The grass displayed greener, more vigorous growth and stronger plants, and remained green until after frost. The improvement in plant vigor persisted following normal lawn mowing during the season. In contrast, an untreated control area remained chlorotic with very little growth and weak plants, and entered dormancy sooner than the treated area.

Except as otherwise noted in the foregoing examples, the application rates have been stated in terms of pounds of the wet (as made) material, per acre. Expressed just in terms of iron content, the useful rates are from roughly about 1 to 100 pounds per acre. However, the rates set forth are suggested guide lines, and the specific rate for optimal plant response and most economical results will depend upon rainfall, soil condition, crops or plants grown, and other factors. Rate of application for different crops and plant conditions can usually be determined by standard agronomic techniques such as soil or leaf analysis.

The new compounds can be mixed with other plant growth supplements, e.g., fertilizers, for application. For example, the compound in dry form can be mixed with a conventional dry fertilizer; or in the liquid form, it can be mixed with liquid fertilizer. In addition to use for correcting iron chlorosis in plants or soils, the new compounds are also believed useful as an iron supplement in animal feeds.

Having described the invention, what is claimed is:

1. As a new compound for correcting iron deficiency in plants aquocarbamide iron II sulfate, corresponding to the formula $$[Fe\{CO(NH_2)_2\}_n(H_2O)_{6-n}]^{++}SO_4^{--}$$

where n is 2, 3, 4 or 5,
said compound comprising dumbbell shaped crystalline particles.

2. The compound of claim 1, in the presence of displaced water of hydration.

3. The dry compound of claim 1.

4. The compound of any of claim 1, 2 or 3 wherein n is 2.

5. The compound of any of claim 1, 2 or 3 wherein n is 3.

6. The compound of any of claim 1, 2 or 3 wherein n is 4.

7. The compound of any of claim 1, 2 or 3 wherein n is 5.

8. The method of converting an iron II sulfate hydrate into a plant nutrient compound having the empirical formula $$[Fe\{CO(NH_2)_2\}_n(H_2O)_{6-n}]^{++}SO_4^{--}$$

wherein n is 2, 3, 4 or 5,
said method including the steps of
mixing particles of urea in an iron II sulfate hydrate in a mole ratio of substantially n:1,
impinging particles of the constituents of the mixture on one another to cause solid state reaction thereof and continuing said impinging for a period of at least about 2 hours until dumbbell-shaped crystals of said plant nutrient compound are formed, said crystals being suspended in water displaced from said hydrate during said impinging.

9. The method of claim 8 wherein the impinging is continued until equilibrium is achieved, as demonstrated by absence of further change in x-ray diffraction pattern and infrared spectrum.

10. The method of claim 8 wherein n is 2.
11. The method of claim 8 wherein n is 3.
12. The method of claim 8 wherein n is 4.
13. The method of claim 8 wherein n is 5.
14. The method of claim 8 wherein the constituents are contacted by milling.
15. The method of claim 8 wherein said constituents are contacted by ball milling for a period in excess of about two hours.
16. The method of claim 8 wherein said urea and hydrate are in crystalline form at the start of said reaction, and the constituents are gradually wetted by water displaced from said hydrate.
17. The method of claim 16 including the further step of drying the wet product to remove the displaced water.
18. The method of claim 17 further wherein water is added to the dried product for spray application.
19. The method of claim 8 wherein water is added to the starting mixture, in an amount insufficient to dissolve the constituents.
20. The method of claim 8 wherein said crystals are suspended in water which is displaced from said hydrate during said impinging, and in added water.

* * * * *